(12) United States Patent
Larkin et al.

(10) Patent No.: US 9,377,103 B2
(45) Date of Patent: Jun. 28, 2016

(54) TRANSFER CASE SPROCKET IDLER GEAR ACTUATION

(75) Inventors: Bradley R. Larkin, Shelby Township, MI (US); Douglas O. Bradley, Sterling Heights, MI (US)

(73) Assignee: Magna Powertrain of America, Inc., Troy, MI (US)

( * ) Notice: Subject to any disclaimer, the term of this patent is extended or adjusted under 35 U.S.C. 154(b) by 54 days.

(21) Appl. No.: 14/115,973

(22) PCT Filed: Feb. 7, 2012

(86) PCT No.: PCT/US2012/024070
§ 371 (c)(1),
(2), (4) Date: Aug. 6, 2014

(87) PCT Pub. No.: WO2013/119204
PCT Pub. Date: Aug. 15, 2013

(65) Prior Publication Data
US 2015/0126318 A1    May 7, 2015

(51) Int. Cl.
*F16H 23/08* (2006.01)
*F16H 61/32* (2006.01)
*B60K 17/344* (2006.01)
*F16H 37/08* (2006.01)

(52) U.S. Cl.
CPC .............. *F16H 61/32* (2013.01); *B60K 17/344* (2013.01); *F16H 37/0813* (2013.01); *F16H 2061/326* (2013.01)

(58) Field of Classification Search
CPC .. B60K 14/344; B60K 17/342; B60K 17/348; B60K 23/08; B60K 2023/0858; B60K 2023/0875; F16H 2003/445; F16H 37/046; F16H 37/042; F16H 37/0813; F16H 2061/326
USPC ............ 475/210, 211, 212, 213, 298; 74/321, 74/665 G, 665 GA, 473.1, 473.12, 473.19, 74/404; 180/248, 251
See application file for complete search history.

(56) References Cited

U.S. PATENT DOCUMENTS

| | | | |
|---|---|---|---|
| 5,499,951 A | 3/1996 | Showalter | |
| 5,711,740 A * | 1/1998 | Bakowski | B60K 17/344 180/247 |
| 6,381,530 B1 * | 4/2002 | Vogt | B60K 17/344 701/67 |
| 8,267,833 B2 | 9/2012 | Mueller et al. | |
| 9,033,842 B2 * | 5/2015 | Larkin | B60K 17/344 475/198 |
| 2007/0251345 A1 * | 11/2007 | Kriebernegg | F16H 61/32 74/335 |
| 2008/0234091 A1 * | 9/2008 | Ronk | B60K 17/3467 475/210 |
| 2013/0017919 A1 | 1/2013 | Klemm et al. | |
| 2014/0187377 A1 | 7/2014 | Bowen et al. | |

* cited by examiner

*Primary Examiner* — Roger Pang
(74) *Attorney, Agent, or Firm* — Dickinson Wright PLLC (57) ABSTRACT

A transfer case includes first and second output shafts selectively driven by an input shaft. A first gearset is driven by the input shaft providing first and second gear ratios to the first output shaft. A range actuator includes an axially moveable member operable to shift the first gearset between the first and second gear ratios. An actuation shaft is coupled to the axially moveable member such that rotation of the actuation shaft translates the axially moveable member. A second gearset is driven by the input shaft and drives the actuation shaft. The second gearset includes a control gear moveable into and out of meshed engagement with a first gear and an idler gear. The actuation shaft is rotated in a first direction when the control gear is meshed with the first gear and rotated in an opposite direction when meshed with the idler gear.

21 Claims, 8 Drawing Sheets

TRANSFER CASE SPROCKET IDLER GEAR ACTUATION

CROSS-REFERENCE TO RELATED APPLICATION

This application is a U.S. National Phase of International Application PCT No. PCT/US2012/024070 filed Feb. 7, 2012. The entire disclosure of the above application is incorporated herein by reference.

FIELD

The present disclosure relates to a shift system for a power transmission device for a vehicle. The shift system utilizes the kinetic energy of a moving driveline component to accomplish a shift.

BACKGROUND

In general, power transfer mechanisms, such as transfer cases, may be operatively associated with either manual or automatic transmissions for selectively directing power from an engine to a first set of driven wheels in a two-wheel drive mode, as well as selectively directing power to a second set of wheels for operation in a four-wheel drive mode. Many transfer cases provide for a mode shift when transferring between two-wheel and four-wheel drive modes, as well as a range shift to provide at least two different reduction ratios to the driven wheels.

Some transfer cases include a range shift system axially translating a range sleeve between low range, neutral and high range positions. The range shift system may include a range shift fork for the application of force to the range sleeve. To achieve a range shift, an actuator typically including a relatively large electric motor, applies a force to the range shift fork. Other mechanical torque transferring devices may be positioned between electric motor and the range shift fork to multiply the apply force provided to the range shift fork. For example, some range shift systems include ball ramp actuators, pilot clutches, and the like.

In some arrangements, the magnitude of force required at the range shift fork to complete a range shift may be significant. Accordingly, the size of the electric motor and the quantity of energy required to complete a shift may be greater than desired. As such, it may be desirable to provide a range shift system operable to use the energy from a driveline component to complete a range shift.

SUMMARY

This section provides a general summary of the disclosure, and is not a comprehensive disclosure of its full scope or all of its features.

A transfer case includes first and second output shafts selectively driven by an input shaft. A first gearset is driven by the input shaft providing first and second gear ratios to the first output shaft. A range actuator includes an axially moveable member operable to shift the first gearset between the first and second gear ratios. An actuation shaft is coupled to the axially moveable member such that rotation of the actuation shaft translates the axially moveable member. A second gearset is driven by the input shaft and drives the actuation shaft. The second gearset includes a control gear moveable into and out of meshed engagement with a first gear and an idler gear. The actuation shaft is rotated in a first direction when the control gear is meshed with the first gear and rotated in an opposite direction when meshed with the idler gear.

A transfer case includes an input shaft as well as first and second output shafts. A planetary gearset including a sun gear, a ring gear, a carrier and a pinion gear rotatably supported by the carrier. The pinion gear is meshed with the sun and ring gears. A range actuator includes first and second range sleeves that are axially translatable between a first position to provide a drive connection between the input shaft and the first output shaft. At a second position, a direct drive ratio connection between the input shaft and the first output shaft as well as the input shaft and the second output shaft is provided. At a third position, a reduced speed drive ratio connection between the input shaft and the first output shaft as well as the input shaft and the second output shaft is provided via the planetary gearset. The range actuator includes an actuation shaft drivingly coupled to the first range sleeve such that rotation of the actuation shaft translates the first range sleeve. Another gearset is driven by the input shaft and drives the actuation shaft. The another gearset includes a first gear, an idler gear and a control gear. The control gear is moveable into and out of meshed engagement with the first gear and the idler gear. The actuation shaft is rotated in a first direction when the control gear is meshed with the first gear and rotated in an opposite direction when meshed with the idler gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

With reference to the Figures, a transfer case constructed in accordance with the teachings of the present disclosure is identified at reference numeral 10. Transfer case 10 is operable to transfer torque from the input shaft 12 to one or both of a first output shaft 14 and a second output shaft 16. First output shaft 14 is drivingly coupled to a first set of driven wheels. Second output shaft 16 is drivingly coupled to a second set of driven wheels.

Transfer case 10 is operable to transmit torque from input shaft 12 to the vehicle wheels via sets of sliding splines as will be described. Transfer case 10 is configured to provide several different modes of operation. Specifically, transfer case 10 provides a two-wheel high-range (2WH) drive mode in which power is only transferred from input shaft 12 to first output shaft 14. As will be detailed, an automatic four-wheel high-range (AUTO-4WH) drive mode is available via variable actuation of an active clutch 17 during operation in the 2WH drive mode so as to also transfer power from input shaft 12 to second output shaft 16 through active clutch 17 and a transfer mechanism 54. As will also be detailed, a locked four-wheel high-range (LOCK-4WH) drive mode and a locked four-wheel low-range (LOCK-4WL) drive mode are also available, as well as a neutral (N) mode. Transfer case 10 is configured such that input shaft 12 is disconnected from components of a planetary gearset 18 in all available drive modes except for the LOCK-4WL drive mode such that the components of planetary gearset 18 are stationary in all of the high-range and neutral modes. Vehicle efficiency is not a primary goal when transfer case 10 operates in the low range. As such, the additional drag associated with rotating the components of planetary gearset 18 in this mode is acceptable.

Transfer case 10 includes a range shift system 19 having a range actuator 20 operable to selectively translate a first range sleeve 22, a second range sleeve 24 and a third range sleeve 26 to a number of different axial positions to provide the drive modes previously described.

First range sleeve 22 includes internal spline teeth 38 engaged with external spline teeth 32 formed on first output shaft 14. A set of external clutch teeth 36 are also formed on first range sleeve 22. Second range sleeve 24 abuts first range sleeve 22 and includes internal spline teeth 34 drivingly engaged with external spline teeth 32 of first output shaft 14 and with external spline teeth 40 formed on input shaft 12. External clutch teeth 42 are formed on second range sleeve 24. Third range sleeve 26 abuts second range sleeve 24 and includes external spline teeth 48 drivingly engaged with internal spline teeth 50 of a drive sprocket 52. Drive sprocket 52 forms a portion of transfer mechanism 54 that is operable to transfer torque to second output shaft 16. More particularly, a flexible member such as a chain 58 drivingly engages drive sprocket 52 as well as a driven sprocket 60. Driven sprocket 60 is fixed for rotation with second output shaft 16. Third range sleeve 26 further includes internal spline teeth 62 and external clutch teeth 64.

Planetary gearset 18 includes a ring gear 70 fixed to a housing 72 of transfer case 10. A sun gear 74 is provided with internal clutch teeth 76. A plurality of pinion gears 78 are drivingly engaged with ring gear 70 and sun gear 74. A plurality of pins 80 support pinion gears 78 for rotation thereon. A first carrier plate 84 is rotatably supported by a bearing 86 and includes a plurality of internal clutch teeth 88. First carrier plate 84 supports a first end of pins 80. A second carrier plate 90 supports a second end of pins 80 and includes internal clutch teeth 94.

Figure 1:
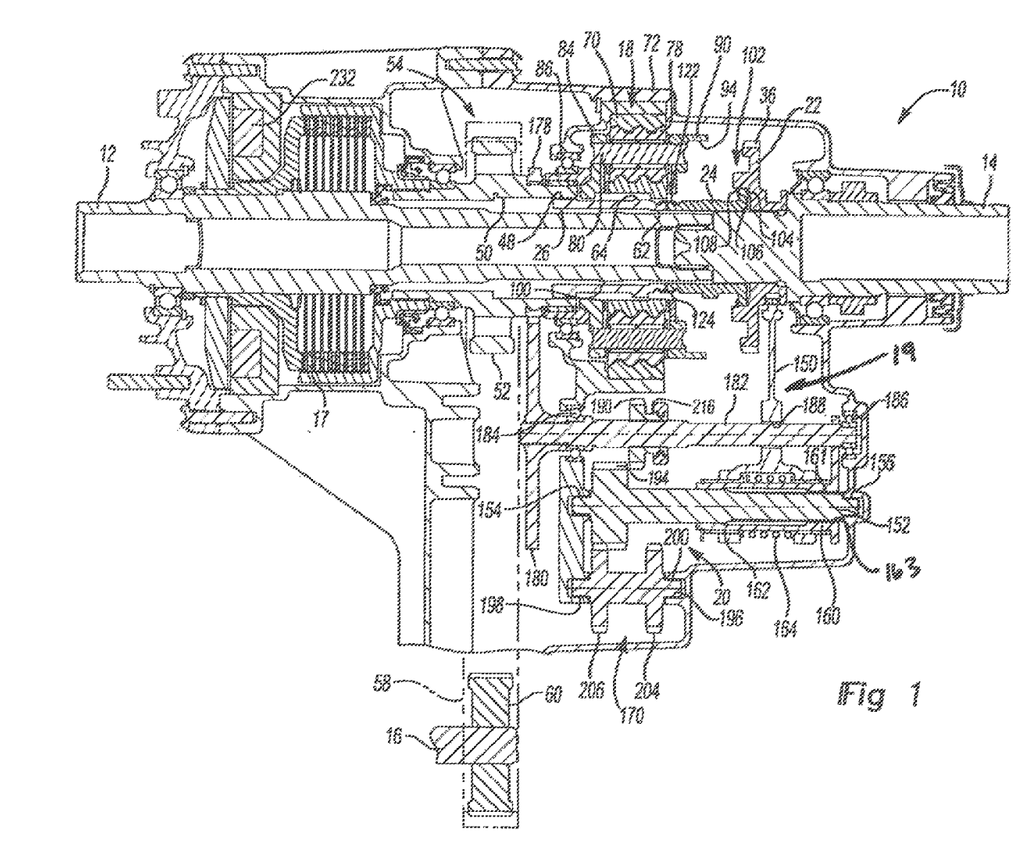
FIG. 1 is a cross-sectional view of an exemplary transfer case equipped with a range actuator constructed in accordance with the teachings of the present disclosure.

FIG. 1 represents transfer case 10 being operated in the two-wheel high range (2WH) drive mode of operation, with the range sleeves located in a "High" position identified as H. At this time, torque is transferred from input shaft 12 to second range sleeve 24. Second range sleeve 24 is drivingly engaged with first output shaft 14 to drive the first set of vehicle wheels. The various clutch teeth previously described are disengaged from the components of planetary gearset 18. Operation and efficiency of transfer case 10 is high due to the fact that planetary gearset 18 is not being driven and transfer mechanism 54 is not being driven in the two-wheel high range (2WH) drive mode. As noted, selective actuation of active clutch 17 while the range sleeves are located in their corresponding high-range (H) positions will result in torque being transferred from input shaft 12 through active clutch 17 to drive sprocket 52 of transfer mechanism 54. The torque is then transferred through transfer mechanism 54 to second output shaft 16. Active clutch 17 is shown in FIG. 1 to include a multi-plate clutch pack operably disposed between a raised clutch hub portion formed on input shaft 12 and a bell-shaped clutch drum which is fixed (i.e. splined) to drive sprocket 52.

To provide the four-wheel drive high range lock (LOCK-4WH) mode of operation, range actuator 20 axially translates first range sleeve 22 to the "High-Lock" position identified as HL. At this time, each of first, second and third range sleeves 22, 24 and 26 are translated to new positions. In particular, third range sleeve 26 is now drivingly engaged with input shaft 12 via meshed engagement of its internal spline teeth 62 with external spline teeth 100 on input shaft 12 as well as with drive sprocket 52 via continued engagement of splines 48, 50. Second range sleeve 24 remains simultaneously engaged with input shaft 12 and first output shaft 14. As such, the four-wheel high range locked (LOCK-4WH) mode of operation is provided since input shaft 12 is mechanically coupled to both first output shaft 14 and second output shaft 16 (via transfer mechanism 54). It should also be appreciated that during this mode of operation, none of the components of planetary gearset 18 are driven.

In a neutral (N) mode of operation, each of first, second and third sleeves 22, 24 and 26 are further axially translated to the positions identified as N. In the neutral mode of operation, teeth 62 and 64 of third range sleeve 26 are disengaged from the other components. Similarly, spline 34 of second range sleeve 24 is disengaged from first output shaft 14. No torque is transferred from input shaft 12 to either first output shaft 14 or second output shaft 16 in the neutral mode of operation.

To achieve the four-wheel low range locked (LOCK-4WL) drive mode, range actuator 20 further axially translates each of the range sleeves to the "Low" position, identified by line L. In the four wheel low range locked mode of operation, second range sleeve 24 drivingly connects input shaft 12 with sun gear 74 through the driving interconnection of clutch teeth 42 and clutch teeth 76. Speed is reduced and torque is multiplied through planetary gearset 18 where first carrier plate 84 and second carrier plate 90 act as output members. Torque is transferred from second carrier plate 90 to first range sleeve 22 via meshed engagement of clutch teeth 94 and clutch teeth 36. First range sleeve 22 remains coupled to first output shaft 14 via splines 38, 32. Similarly, first carrier plate 84 transfers torque to third range sleeve 26 via engagement of clutch teeth 64 and clutch teeth 88. Third range sleeve 26 remains drivingly coupled to drive sprocket 52 to transfer torque to second output shaft 16.

A coupling 102 interconnects first range sleeve 22 and second range sleeve 24. Coupling 102 includes a first thrust washer 104 positioned between first range sleeve 22 and second range sleeve 24. A second thrust washer 106 is positioned between second range sleeve 24 and a snap ring 108. Snap ring 108 is fixed to first range sleeve 22. Coupling 102 couples first range sleeve 22 and second range sleeve 24 for concurrent axial translation with one another. Coupling 102 allows relative rotation between first range sleeve 22 and second range sleeve 24. Coordinated movement of first range sleeve 22 and second range sleeve 24 is assured in both axial directions.

Second range sleeve 24 is coupled to third range sleeve 26 by a connector 122. Connector 122 may include a metallic sleeve having a cylindrically shaped center portion 124 overlapping an end 126 of second range sleeve 24 and an end 128 of third range sleeve 26. Second range sleeve 24 includes a groove 132 in receipt of a first downturned portion 134 of connector 122. A running clearance exists between cylindrical portion 124, first downturned portion 134 and second range sleeve 24. A groove 136 is formed on third range sleeve 26. Connector 122 includes a second downturned portion 138 positioned within groove 136. Second downturned portion 138 and substantially cylindrical portion 124 are clear of third range sleeve 26 such that second range sleeve 24 is axially coupled to third range sleeve 26 but relative rotation between the second and third range sleeves may occur. It is contemplated that connector 122 is constructed from a malleable metal initially shaped as a cylinder. A crimping operation may be used to define first downturned portion 134 and second downturned portion 138. A low cost, low weight coupling is provided.

Range actuator 20 is operable to selectively translate first range sleeve 22, second range sleeve 24 and third range sleeve to the various axial positions previously described. Range actuator 20 includes a shift fork 150 that is driven to an axial position corresponding to the transfer case modes previously described. An actuation shaft 152 is supported for rotation within housing 72 by bearings 154, 156. Actuation shaft 152 passes through and is drivingly engaged with a carrier 160. Specifically, an external thread 161 is formed on actuation shaft 152 which is in constant threaded engagement with an internal thread 163 formed in carrier 160. Rotation of actuation shaft 152 axially translates carrier 160. A sleeve 162 surrounds a portion of carrier 160 and is axially moveable relative thereto. Sleeve 162 cooperates with a spring 164 and shift fork 150 to center sleeve 162 and shift fork 150 relative to carrier 160. The spring and sleeve arrangement allows carrier 160 to temporarily translate while shift fork 150 remains stationary during a blocked shift. Spring 164 continues to load shift fork 150 and first range sleeve 22 toward a desired axial position during the blocked condition. Once the blocked shift has cleared, shift fork 150 completes its targeted motion.

A gear train 170 is provided to transfer torque from drive sprocket 52 to actuation shaft 152 during a range shift. An operator 174 cooperates with gear train 170 to rotate actuation shaft 152 in one of a first direction or an opposite second direction. Gear train 170 includes a drive gear 178 fixed for rotation with drive sprocket 52. A driven gear 180 is in constant mesh engagement with drive gear 178. An intermediate shaft 182 is supported within housing 72 by bearings 184, 186. Intermediate shaft 182 passes through an aperture 188 formed in shift fork 150. Driven gear 180 is fixed for rotation with intermediate shaft 182. An axially translatable control gear 190 is splined for rotation with intermediate shaft 182. Control gear 190 is shown at a disengaged or neutral position in FIG. 1. An output gear 194 is fixed for rotation with actuation shaft 152. Control gear 190 may be axially translated from its neutral position to the left, as viewed in FIG. 1, to a first actuated position whereat control gear 190 meshingly engages with output gear 194.

An idler shaft 196 is supported for rotation within housing 72 by a first bearing 198 and a second bearing 200. A first idler gear 204 is fixed for rotation with idler shaft 196. A second idler gear 206 is axially spaced apart from first idler gear 204 and also fixed for rotation with idler shaft 196. Second idler gear 206 is positioned in constant mesh engagement with output gear 194. Control gear 190 may be axially translated from its neutral position to the right, as viewed in FIG. 1, to a second actuated position whereat control gear 190 meshingly engages with first idler gear 204. It should be appreciated that FIG. 1 depicts each of the components of gear train 170 lying along the plane of the figure for ease of description. The perspective views of FIGS. 2 and 3 as well as the cross-sectional view of FIG. 4 more accurately depict the three dimensional positioning of the components.

Figure 2:
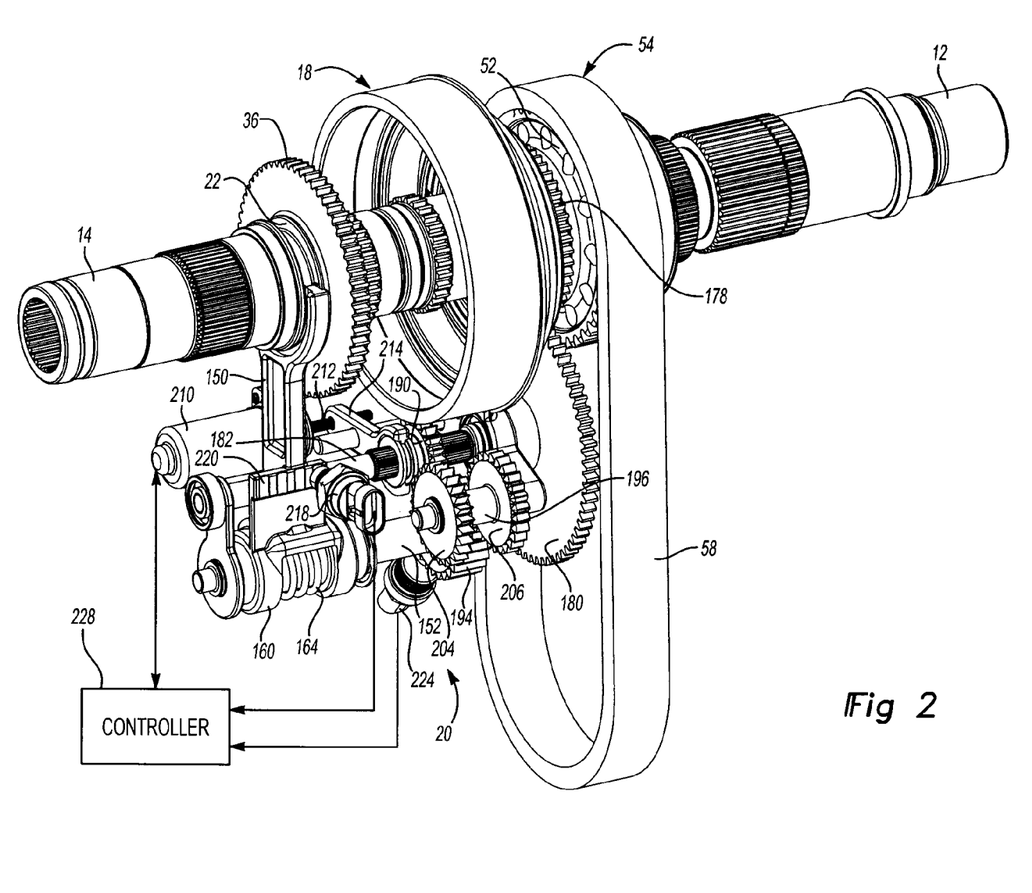
FIG. 2 is a fragmentary perspective view of a portion of the transfer case and the range actuator.
Figure 3:
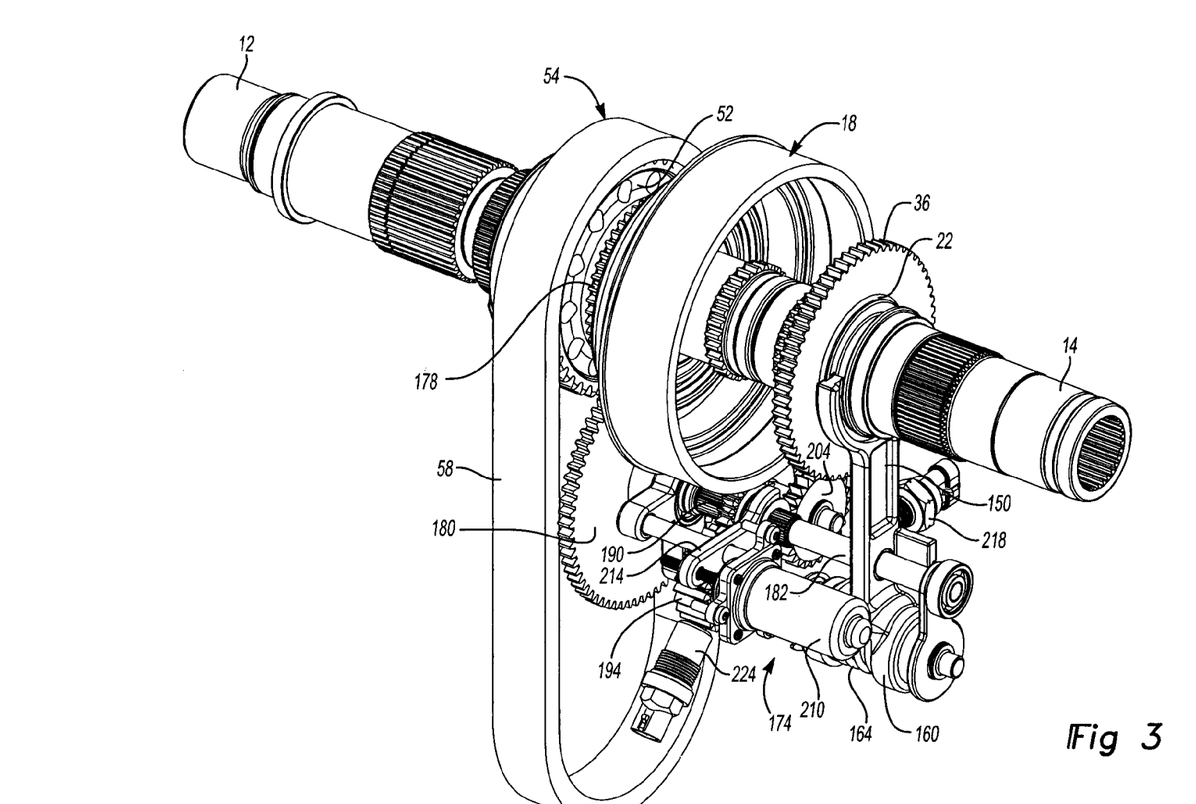
FIG. 3 is another perspective view of a portion of the transfer case and the range actuator.
Figure 4:
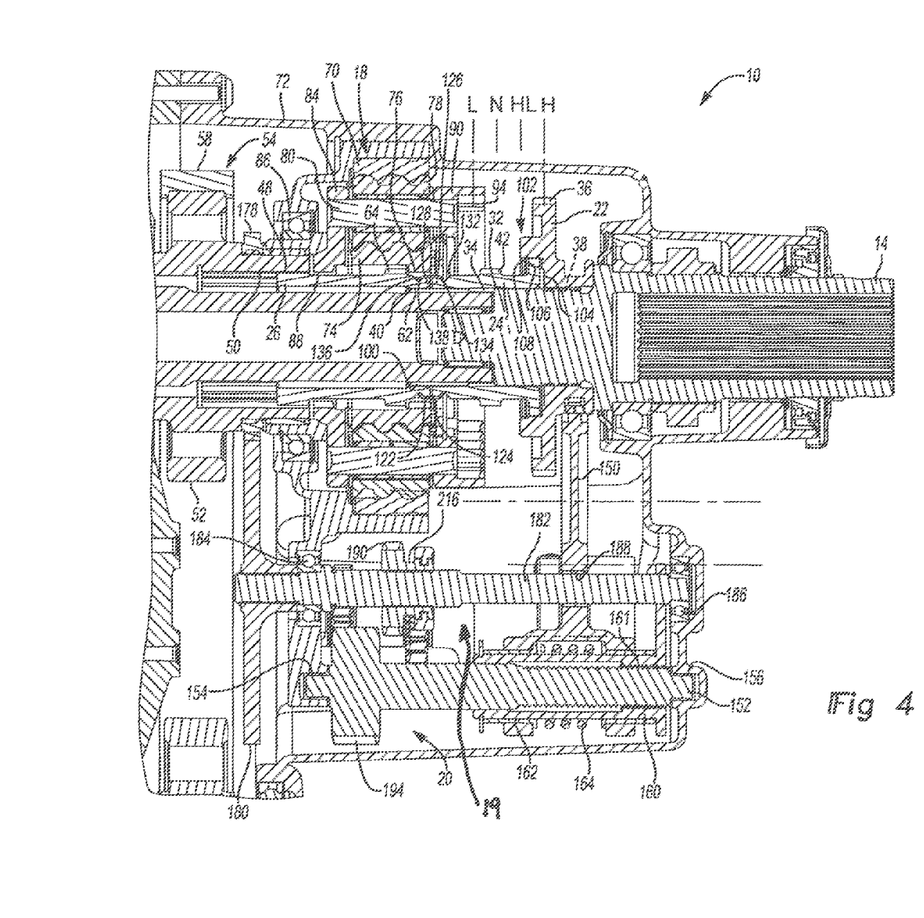
FIG. 4 is a fragmentary cross-sectional view taken through the transfer case of FIGS. 1-3 having the components of the range actuator depicted in their proper 3-D position.
Figure 5:
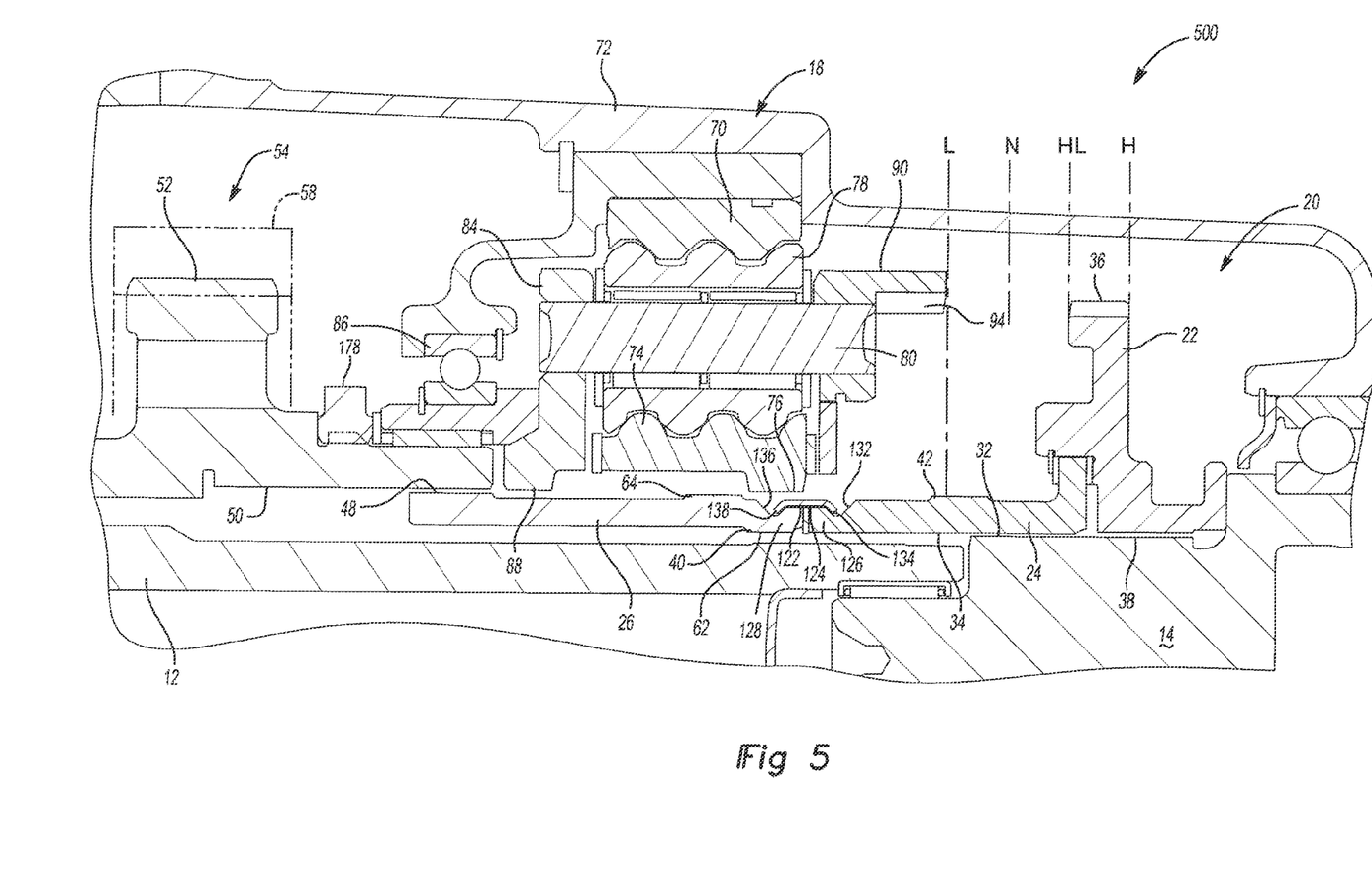
FIG. 5 is a fragmentary enlarged sectional view of a portion of FIG. 1.

Operator 174 is best shown in FIGS. 2 and 3 to include an electric motor 210 having a threaded output shaft 212. A control fork 214 is in threaded engagement with output shaft 212 such that rotation of output shaft 212 causes axial translation of control fork 214. A groove 216 formed in control gear 190 is in receipt of control fork 214. Electric motor 210 is sized to only provide enough energy to axially translate control gear 190 to the positions described. The energy to axially translate first range sleeve 22, second range sleeve 24 and third range sleeve 26 is provided from rotation of drive sprocket 52.

A shift fork position sensor 218 cooperates with shift fork 150 to output a signal indicative of the axial position of first range sleeve 22. A plurality of detents 220 are formed in shift fork 150. Shift fork position sensor 218 may include the plunger operable to enter and exit detents 220 as shift fork 150 translates. A speed sensor 224 is operable to output a signal indicative of the rotational speed of output gear 194. A controller 228 is in communication with electric motor 210, shift fork position sensor 218 and speed sensor 224 to properly position and confirm the position of shift fork 150. For example, controller 228 may determine the rotational speed and direction of rotation of output gear 194 based on the signal provided by speed sensor 224. Controller 228 uses the geometry of the threaded interconnection between actuation shaft 152 and carrier 160 in combination with the speed and direction of rotation of actuation shaft 152 to determine the direction and magnitude of linear travel of carrier 160. Controller 228 is also in communication with an actuator 232 operable to vary the input force provided to active clutch 17.

In operation, electric motor 210 may be actuated to rotate output shaft 212 in a direction to translate control fork 214 in a first direction that urges control gear 190 to move toward the left as viewed in FIG. 1 from its neutral position into its first actuated position. Control gear 190 meshes with output gear 194. During a range shift, active clutch 17 may be controlled to transfer torque from input shaft 12 to drive sprocket 52 for rotating drive gear 178. Controller 228 also energizes actuator 232 to transfer torque across active clutch 17. Torque is transferred from drive gear 178 to actuation shaft 152 to translate shift fork 150 in a first direction such as the direction for moving first range sleeve 22 from position H to position HL. Once shift fork position sensor 218 indicates that the HL position has been reached, electric motor 210 is energized to rotate output shaft 212 in an opposite direction to axially translate control gear 190 from its first actuated position back to its neutral position. Similar shifts may occur when a right to left movement of shift fork 150 is desired.

To translate shift fork 150 in the opposite direction, or from left to right as viewed in FIG. 1, electric motor 210 is energized to rotate output shaft 212 in a direction to cause control fork 214 to move in a second direction for urging control gear 190 to move to the right from its neutral position into its second actuated position. Once control gear 190 drivingly engages first idler gear 204, electric motor 210 is no longer energized. Torque may once again be transferred across clutch 17 to rotate drive gear 178 and the other members of gear train 170. Because control gear 190 is now meshingly engaged with first idler gear 204, torque is transferred through idler shaft 196 and second idler gear 206 to output gear 194. Output gear 194 is rotated in the opposite direction as previously described. Actuation shaft 152 is rotated in a direction to cause shift fork 150 to move from the left to the right as viewed in FIG. 1 to provide the desired combination range and mode shift. It should be appreciated that actuator 20 exhibits improved controllability as compared to previously known designs as the engagement speed of the first, second and third sleeves 22, 24, 26 may be adjusted based on controlling active clutch 17. In addition, through the use of multiple spur gears in gear train 170 and a relatively small electric motor 210, the electrical energy and packaging space required to accomplish a range shift are minimized.

Figure 6:
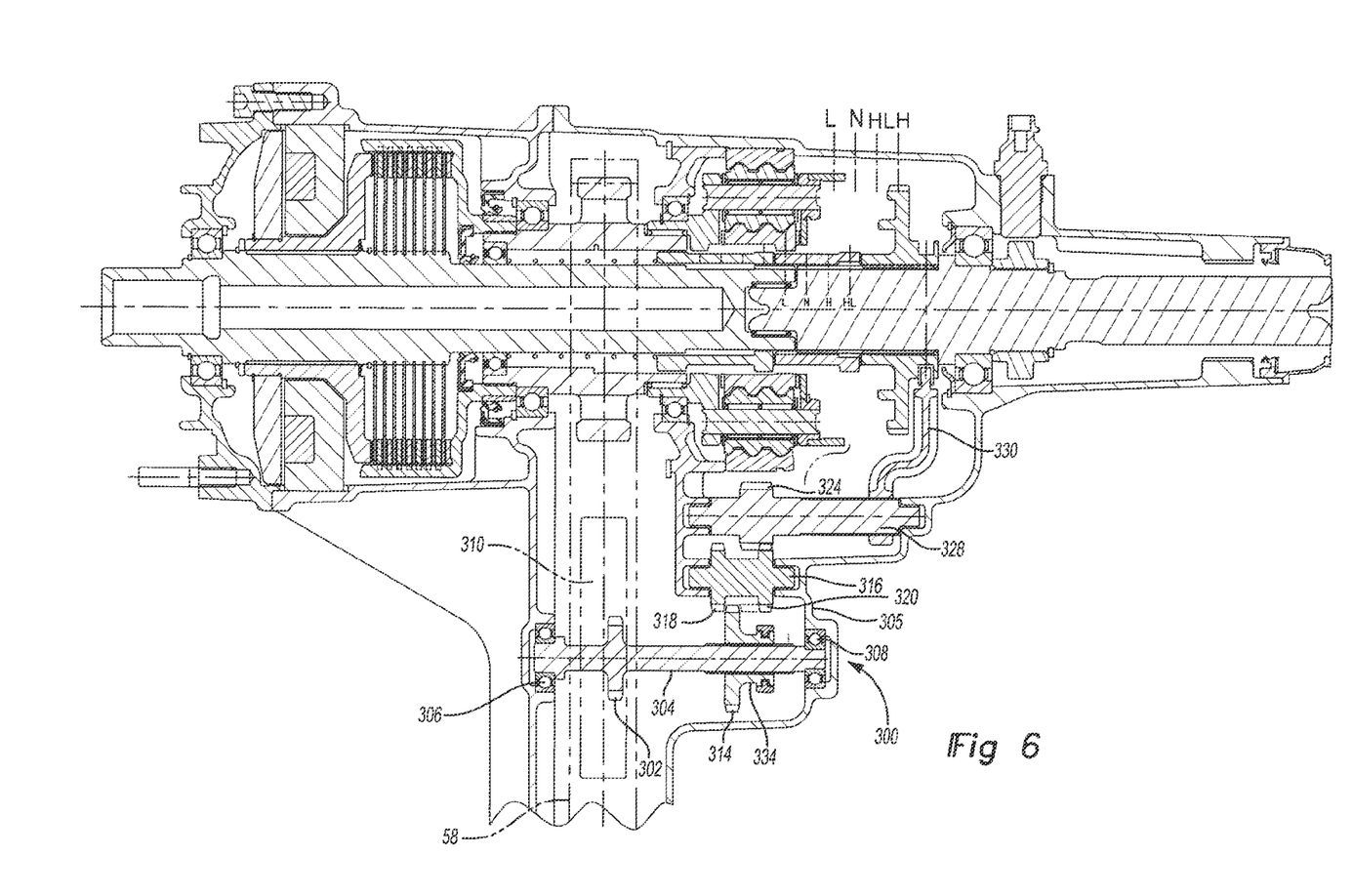
FIG. 6 is a fragmentary cross-sectional view of another transfer case equipped with another range actuator.
Figure 7:
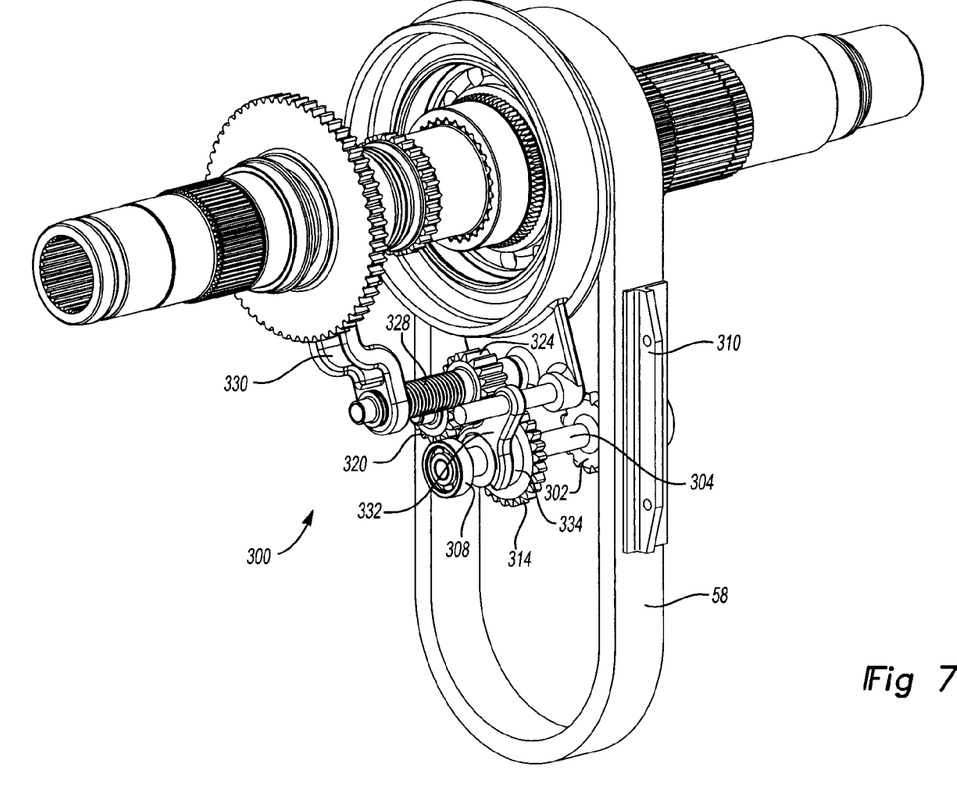
FIG. 7 is a fragmentary perspective view of the transfer case and range actuator depicted in FIG. 6.
Figure 8:
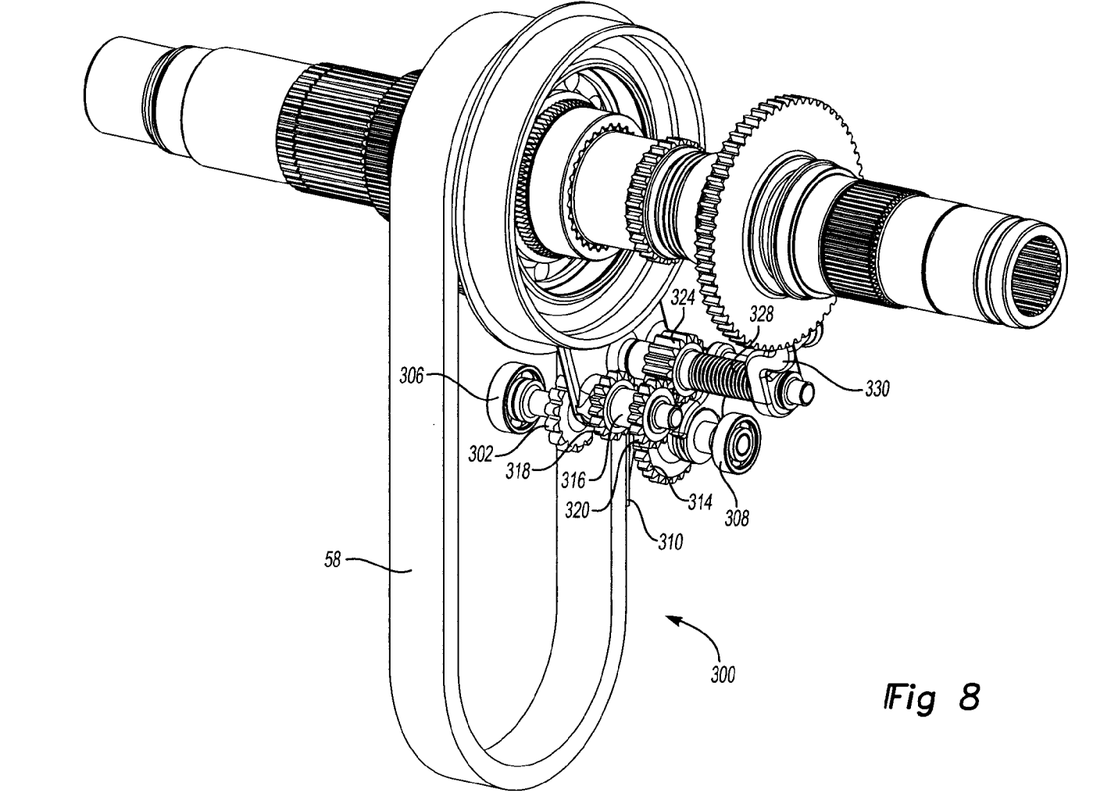
FIG. 8 is another fragmentary perspective view of the transfer case and range actuator depicted in FIG. 6.

FIGS. 6-8 depict an alternate range actuator 300. Range actuator 300 is substantially similar to range actuator 20 with the exception that a drive gear is no longer fixed for rotation with the drive sprocket but alternatively placed in driving engagement with chain 58. More particularly, a drive gear 302 is fixed for rotation with an intermediate shaft 304 that is supported for rotation in a housing 305 by bearings 306, 308. A snubber or guide plate 310 is positioned on an opposite side of chain 58 as drive gear 302 to maintain a driving engagement between chain 58 and drive gear 302. A chain tensioner (not shown) may be implemented to maintain proper driving engagement between drive sprocket 52, driven sprocket 60 and drive gear 302, if required.

A control gear 314 is axially moveable relative to and splined for rotation with intermediate shaft 304. An idler shaft 316 is rotatably supported in housing 305 and includes a first idler gear 318 and a second idler gear 320 fixed for rotation thereto. An output gear 324 is in constant meshed engagement with second idler gear 320. An actuation shaft 328 is threadingly coupled to a shift fork 330. Output gear 324 is fixed for rotation with actuation shaft 328. Rotation of actuation shaft 328 translates shift fork 330. Actuation shaft 328 is also supported for rotation in housing 305.

A control fork 332 is positioned within a groove 334 formed in control gear 314. An operator (not shown), but similar to operator 174, may be used to axially translate control gear 314 from a central disengaged position to first and second engaged positions. Operation of range actuator 300 is substantially the same as previously described in relation to range actuator 20. It should be appreciated that the direct drive interconnection between actuation shaft 328 and shift fork 330 may be replaced with the carriage and spring arrangement previously described and vice versa. In addition, it should be appreciated that while actuators 20 and 300 have been depicted in conjunction with a multiple range sleeve shift system, the range actuators of the present disclosure may cooperate with any number of other shift systems including an axially moveable shift member.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case comprising:
an input shaft;
first and second output shafts selectively driven by the input shaft;
a first gearset driven by the input shaft providing first and second gear ratios to the first output shaft; and
a range actuator including:
an axially moveable member operable to shift the first gearset between the first and second gear ratios;
an actuation shaft drivingly coupled to the axially moveable member such that rotation of the actuation shaft translates the axially moveable member;
a second gearset driven by the input shaft and selectively driving the actuation shaft, the second gearset including a control gear moveable into and out of meshed engagement with a first gear as well as into and out of meshed engagement with an idler gear, wherein the actuation shaft is rotated in a first direction when the control gear is meshed with the first gear and rotated in a second opposite direction when meshed with the idler gear.

2. The transfer case of claim 1, further including a power transfer mechanism drivingly interconnecting at least one of the input shaft and the first output shaft with the second output shaft, wherein the second gearset includes a drive gear fixed for rotation with a drive sprocket of the power transfer mechanism, and wherein the control gear is rotatably driven by the drive gear.

3. The transfer case of claim 1, further including a power transfer mechanism drivingly interconnecting at least one of the input shaft and the first output shaft with the second output shaft, wherein the second gearset includes a drive gear in meshed engagement with a chain of the power transfer mechanism, and wherein the control gear is rotatably driven by the drive gear.

4. The transfer case of claim 1, wherein the first gear is fixed for rotation with the actuation shaft, wherein the second gearset includes an idler shaft spaced apart from the actuation shaft, the idler gear and a second idler gear being fixed for rotation with the idler shaft, and wherein the second idler gear is in meshed engagement with the first gear.

5. The transfer case of claim 4, wherein the control gear is moveable from a position disengaged from each of the first gear and the idler gear into a first position engaged with the first gear and into a second position engaged with the idler gear.

6. The transfer case of claim 5, wherein the control gear is fixed for rotation with and axially moveable relative to an intermediate shaft driven by the input shaft.

7. The transfer case of claim 6, wherein the first gearset includes a planetary gearset circumscribing an axis about which the input shaft rotates.

8. The transfer case of claim 1, further including a clutch drivingly interconnecting the input shaft and the second gearset.

9. The transfer case of claim 1, further including an electric motor having an output shaft drivingly coupled to the control gear.

10. The transfer case of claim 9, wherein rotation of the electric motor output shaft in a first rotary direction translates the control gear in a first linear direction into a first position in meshed engagement with the first gear and rotation of the electric motor output shaft in a second opposite direction translates the control gear in a second opposite linear direction into a second position in meshed engagement with the idler gear.

11. The transfer case of claim 10, wherein the control gear is operable in the first position to cause the actuation shaft to rotate in the first direction for moving the axially moveable member in a first direction so as to shift the first gearset into the first gear ratio, and wherein the control gear is operable in the second position to cause the actuation shaft to rotate in the second direction for moving the axially moveable member in a second direction so as to shift the first gearset into the second gear ratio.

12. The transfer case of claim 11, wherein the control gear is operable in the first position to cause the actuation shaft to rotate in the first direction for moving the axially moveable member in a first direction so as to shift the first gearset into the first gear ratio, and wherein the control gear is operable in the second position to cause the actuation shaft to rotate in the second direction for moving the axially moveable member in a second direction so as to shift the first gearset into the second gear ratio.

13. A transfer case comprising:
an input shaft;
first and second output shafts;
a first gearset including a sun gear, a ring gear, a carrier and a pinion gear rotatably supported by the carrier, the pinion gear being meshingly engaged with the sun and ring gears; and
a range actuator including first and second range sleeves being axially translatable between a first position to provide a direct drive ratio connection between the input shaft and the first output shaft, a second position to provide a direct drive ratio connection between the input shaft and the first output shaft as well as the input shaft and the second output shaft, and a third position to provide a reduced speed drive ratio connection between the input shaft and the first output shaft as well as the input shaft and the second output shaft via the first gearset, the range actuator further including:
an actuation shaft drivingly coupled to the first range sleeve such that rotation of the actuation shaft translates the first range sleeve;
a second gearset driven by the input shaft and selectively driving the actuation shaft, the second gearset including a first gear, an idler gear meshed with the first gear, and a control gear, the control gear being moveable into and out of meshed engagement with the first gear as well as into and out of meshed engagement with the idler gear, wherein the actuation shaft is rotated in a first direction when the control gear is meshed with the first gear and is rotated in a second opposite direction when meshed with the idler gear.

14. The transfer case of claim 13, wherein the second gearset includes an idler shaft spaced apart from the actuation shaft, the idler gear and a second idler gear being fixed for rotation with the idler shaft, and wherein the first gear is fixed for rotation with the actuation shaft.

15. The transfer case of claim 14, wherein the control gear is moveable from a position disengaged from each of the first gear and the second idler gear into a first position engaged with the first gear and into a second position engaged with the second idler gear.

16. The transfer case of claim 15, wherein the control gear is fixed for rotation with and axially moveable relative to an intermediate shaft driven by the input shaft.

17. The transfer case of claim 16, further including a clutch operable for selectively interconnecting the input shaft and the second gearset.

18. The transfer case of claim 13, further including a power transfer mechanism drivingly interconnecting the first output shaft and the second output shaft, wherein the second gearset includes a drive gear fixed for rotation with a drive sprocket of the power transfer mechanism.

19. The transfer case of claim 13, further including a power transfer mechanism drivingly interconnecting the first output shaft and the second output shaft, wherein the second gearset includes a drive gear in meshed engagement with a chain of the power transfer mechanism.

20. The transfer case of claim 13 further including an electric motor having an output shaft drivingly coupled to the control gear, wherein rotation of the electric motor output shaft in a first rotary direction translates the control gear in a first linear direction into a first position in meshed engagement with the first gear, and wherein rotation of the electric motor output shaft in a second opposite direction translates the control gear in a second opposite linear direction into a second position in meshed engagement with the idler gear.

21. A transfer case comprising:
an input shaft;
first and second output shafts;
a transfer mechanism having a drive sprocket rotatably surrounding the input shaft, a driven sprocket fixed for rotation with the second output shaft, and a chain interconnecting the drive and driven sprockets;
a clutch operable for selectively coupling the drive sprocket to the input shaft;
a first gearset having a non-rotary ring gear, a sun gear, a planet carrier, and planet gears rotatably supported by the planet carrier and which are in constant meshed engagement with the ring gear and the sun gear; and
a shift system having range sleeves and a range actuator, the range sleeves being axially moveable between a first position to provide a direct ratio drive connection between the input shaft and the first output shaft, a second position to provide a direct ratio drive connection between the input shaft and both of the first and second output shafts, and a third position to provide a reduced ratio drive connection between the input shaft and both of the first and second output shafts, the range actuator being operable to move the range sleeves between the three distinct positions and including an actuator shaft, a second gearset rotatably driven by one of the drive sprocket and the chain of the transfer mechanism, an operator mechanism for selectively coupling the actuation shaft for rotation with second gearset, and a conversion mechanism for converting rotation of the actuation shaft into axial movement of the range sleeves,
wherein the second gearset includes a drive gear fixed for rotation with an intermediate shaft and being driven by the one of the drive sprocket and the chain, an output gear fixed for rotation with the actuation shaft, an idler gear meshed with the output gear, and a control gear rotatably driven by the intermediate shaft, the control gear being moveable from a disengaged position into a first engaged position meshed with the output gear for causing the actuation shaft to rotate in a first direction and into a second engaged position meshed with the idler gear for causing the actuation shaft to rotate in a second direction, wherein the operator mechanism is operable to move the control gear between the disengaged position and the first and second engaged positions, wherein the conversion mechanism is operable to move the range sleeves in a first axial direction in response to rotation of the actuation shaft in the first rotary direction and to move the range sleeves in a second axial direction in response to rotation of the actuation shaft in the second rotary direction.

* * * * *